Nov. 12, 1957  L. ARNETT  2,812,879
DISPENSING APPARATUS AND METHOD
Filed Sept. 18, 1953  3 Sheets-Sheet 2
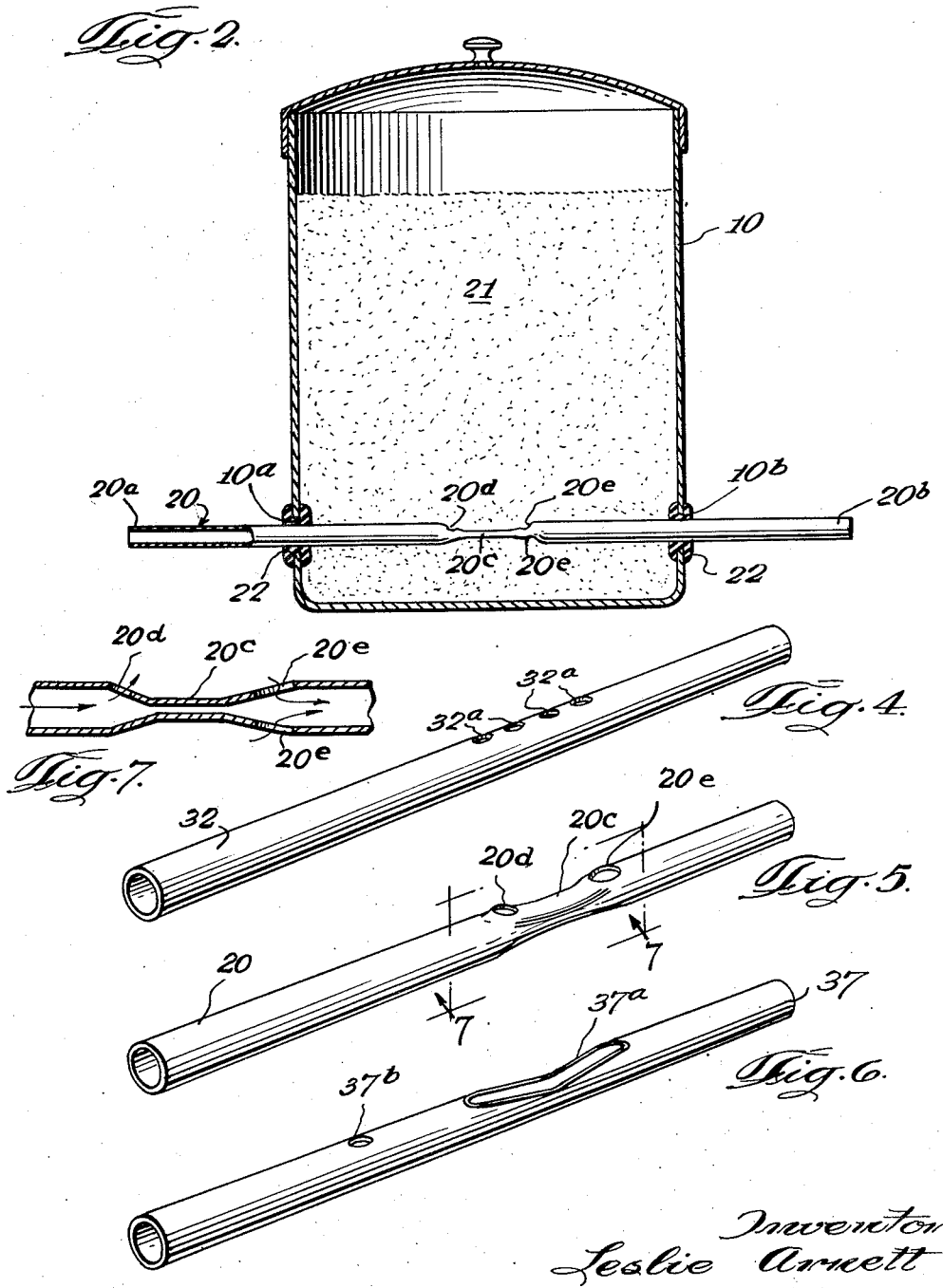

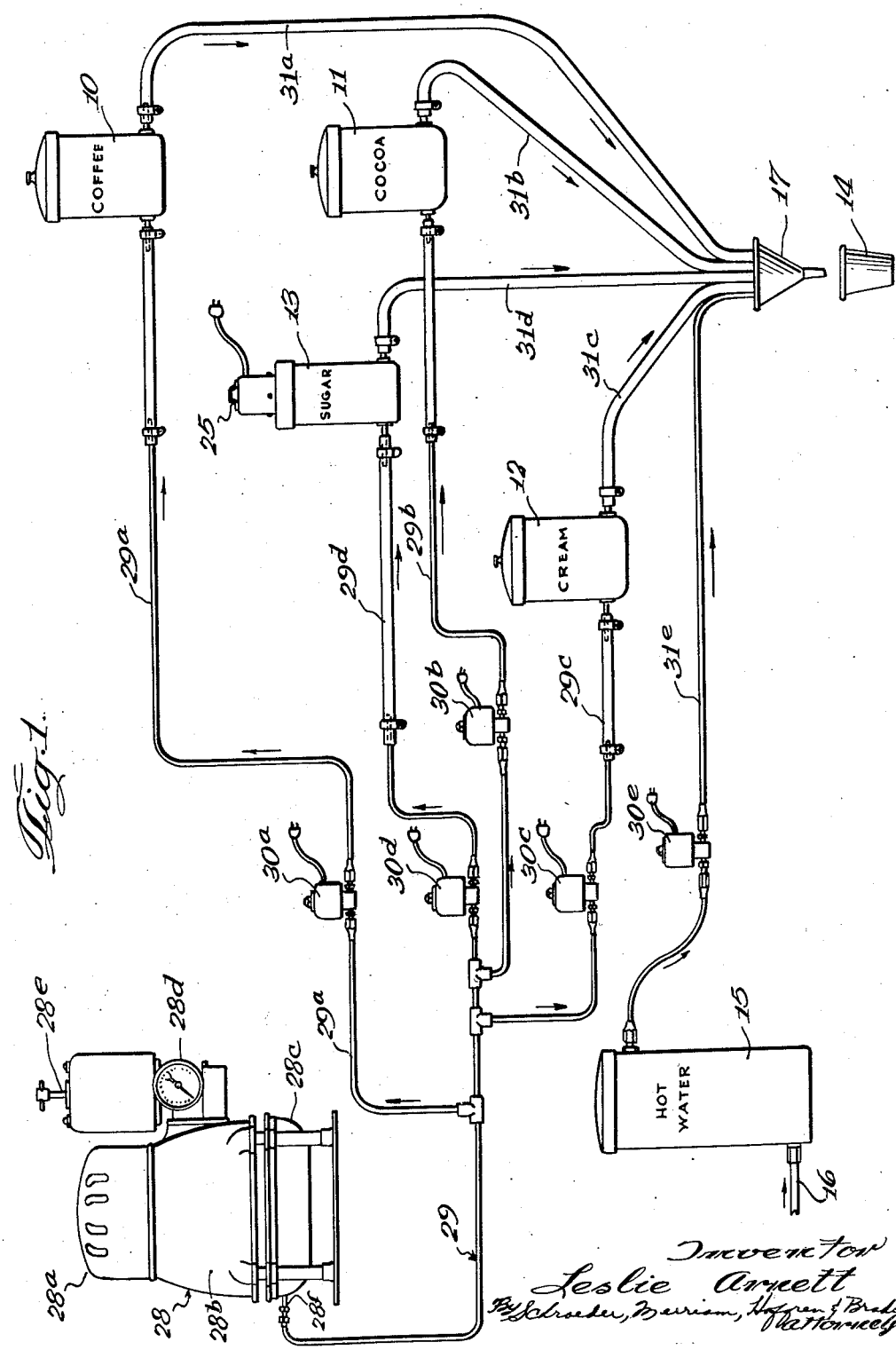

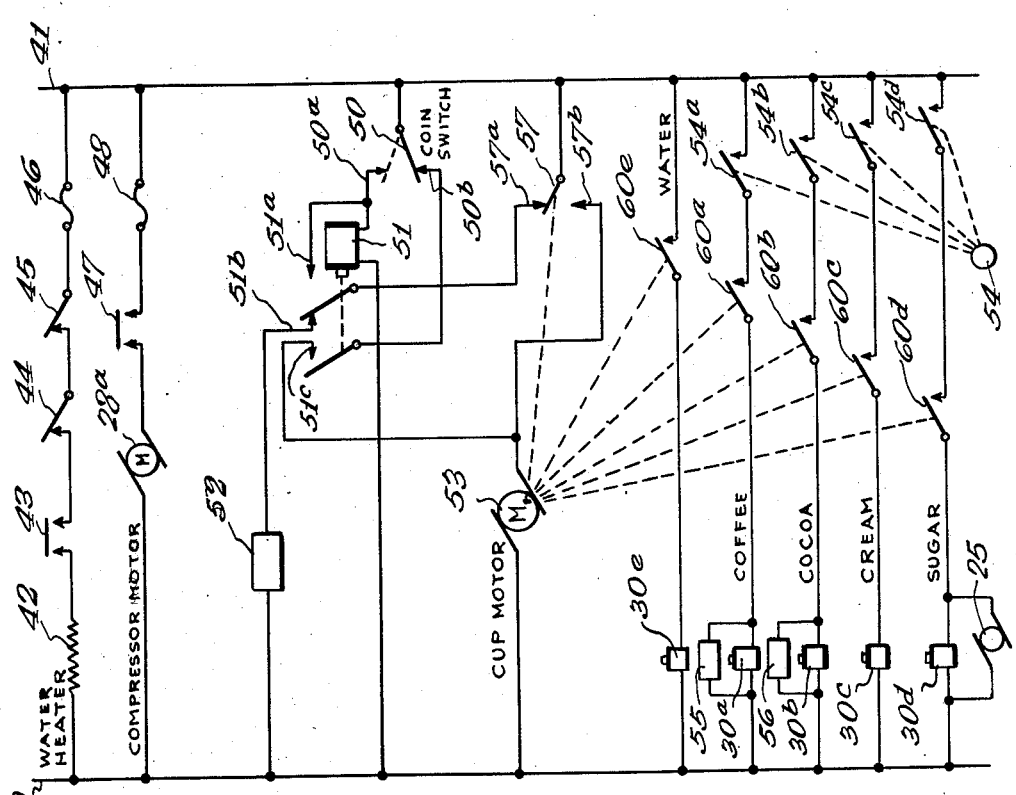
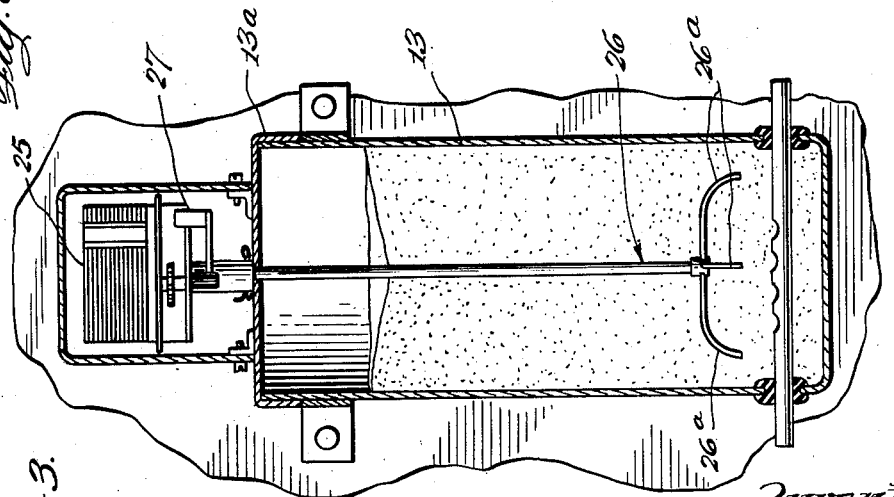

United States Patent Office 2,812,879
Patented Nov. 12, 1957

2,812,879

DISPENSING APPARATUS AND METHOD

Leslie Arnett, Chicago, Ill., assignor to United Coffee Corp., a corporation of Illinois Application September 18, 1953, Serial No. 381,087

24 Claims. (Cl. 222—1)

This application relates to an apparatus for dispensing or discharging quantities of particulate material from a container and more particularly to a compressed air apparatus for discharging relatively small quantities of finely divided or powdered material from a container.

There are many forms of dispensing apparatus for discharging quantities, predetermined or otherwise, of finely divided or powdered material. Generally, these devices are rather complicated mechanically; and prior apparatus for use in beverage dispensers where it is desired to add a small predetermined quantity of a powdered ingredient to a beverage have disadvantages overcome by my system. For example, rotary measuring valve dispensers and rotary worm dispensers are quite well known. Both of these devices, however, have moving parts which come in contact with the material to be dispensed and must be disassembled from time to time for cleaning, a rather difficult and time consuming operation; and they are subject to clogging and jamming. Furthermore, such apparatus requires electrical operating equipment, as an electric motor or the like for each material to be dispensed, and accordingly is rather expensive.

I have devised and disclose and claim herein a dispensing device for dispensing or discharging finely divided or powdered material which has no moving parts in contact with the material, is cheap to manufacture, foolproof in operation and easy to disassemble for cleaning.

One feature of the invention is that flow of a gas, such as compressed air, is used to cause the discharge of a quantity of finely divided material from a container. Another feature is that means defining a passageway is operably associated with a container adapted to contain a supply of finely divided material and means are provided for causing a charge of compressed gas to pass through the passageway carrying a quantity of material with it. A further feature is that the apparatus provides means for agitating the material within the container. Still another feature is that an apertured passageway is communicably associated with the container whereby a quantity of the material flows into the passageway, from which it may be discharged or expelled by a flow of gas passing therethrough.

Yet another feature is that at least a portion of the passageway extends through the container means and is adapted to receive a quantity of material therefrom. Still a further feature is that a tube having a plurality of apertures therein extends through the container and is adapted to have a quantity of material enter the tube through the apertures, the tube having an inlet and outlet; a first passageway connects a source of compressed air to the inlet and a second passageway is connected to the outlet; and a valve in the first passageway may be opened momentarily whereby a charge of compressed air passes through the first passageway, the tube and the second passageway, carrying along a quantity of finely divided material from the container through the second passageway.

Another feature of the invention is that it may be incorporated in a beverage dispenser and utilized to add a quantity of a desired finely divided ingredient to a dispensed beverage. A further feature is that a single source of compressed air may be used to dispense a plurality of ingredients.

Yet another feature is that the passageway means or tube through the container is provided with a plurality of longitudinally spaced apertures. And a further feature is that one of the apertures is an elongated V-shaped slot. Still another feature is that the passageway means has a restricted portion, there being at least one aperture on the inlet side of the restricted portion and at least a pair of opposed apertures on the outlet side thereof.

Further features and advantages will readily be apparent from the specification and from the drawings, in which:

Figure 1 is a flow-sheet diagram illustrating a beverage dispenser embodying the invention;

Figure 2 is a vertical sectional view of a dispenser illustrating one embodiment of the invention;

Figure 3 is a vertical sectional view of a modified dispenser, provided with mechanical means for agitating the material therein;

Figure 4 is a perspective view of one form of the apertured passageway or tube which extends through the container;

Figure 5 is a perspective view of the tube of Figure 2;

Figure 6 is a perspective view of another modified tube;

Figure 7 is a fragmentary vertical section taken along the line 7—7 of Figure 5; and Figure 8 is a schematic diagram of a control circuit which may be used with the dispenser of Figure 1.

Referring now to the drawings, a beverage dispensing apparatus is shown in Figure 1. The receptacle or container 10 is adapted to hold a supply of a finely divided or powdered ingredient of the desired beverage as, for example, powdered coffee, while similar receptacles 11 and 12 may contain supplies of other powdered or finely divided ingredients such as cocoa and powdered cream. The container 13, which is somewhat different in construction, may contain a supply of powdered sugar.

As will appear fully later, suitable quantities of the desired powdered ingredients are discharged or dispensed from the respective containers and are delivered to a cup 14 to form part of a desired beverage.

A liquid ingredient of the beverage is also delivered to the cup 14 from a suitable source such as the water heater 15, which has an inlet 16 that may be connected to a source of water, as a water main (not shown). The powdered and liquid ingredients of the beverage may be mixed in the mixing means shown as the funnel 17 if so desired before they are delivered to the cup 14, or preferably, delivered directly to the cup which then acts as the mixing means. The control and operating circuits for this dispenser will be described later.

Referring now to Figure 2, the powdered coffee container 10 (the cocoa and powdered cream containers 11 and 12 may be of identical construction) has a pair of openings 10a and 10b in the side walls thereof. An apertured tube 20 extends through the openings 10a and 10b and provides a passageway through the container 10. At least some of the apertures in the tube 20 are on the upper side thereof in order that a quantity of the finely divided or powdered material 21 will flow into the passageway formed by the tube. It has been found that if a charge of a compressed gas, as for example compressed air, is introduced into the tube at the inlet 20a thereof it will pass through the tube 20 and out through the outlet 20b, carrying with it a quantity of the powdered material. The exact quantity of material carried by the charge of compressed air and discharged or dispensed from the container depends primarily on the size and number of the apertures 20a in the tube. The charge of compressed air should last for two or three seconds; extending its duration beyond this time has little effect on the quantity of material dispensed.

Rubber grommets 22 are placed in the openings 10a and 10b in the walls of the container 10 to provide a seal with the tube 20 in order to prevent any of the material 21 from leaking out.

A portion of the charge of compressed air which passes through the tube 20, effecting the discharge of a quantity of the material, passes out through at least some of the apertures and agitates the material within the container, preventing caking thereof.

Figure 3 illustrates a modified form of container which may be used to hold a supply of powdered sugar. It has been found that powdered sugar has a greater tendency to cake and to form lumps than does powdered coffee or powdered cream; and the agitating action of that portion of the charge of compressed air which escapes through the apertures of the dispensing tube was found to be insufficient to prevent this caking. Accordingly, mechanical agitating means are provided for the powdered sugar. As shown, these means include an electric motor 25 mounted on the cover 13a of the sugar container and arranged to drive an agitator 26 through a speed reducing arrangement 27. Spring fingers 26a at the lower end of the agitator, and spaced above the dispensing tube break up any lumps of powdered sugar when the agitator is rotated.

Referring now to Figures 4 through 7, various arrangements of the apertures in the dispensing tube are shown. In each case, the inlet of the tube is on the left and the outlet is on the right.

The tube 32, Figure 4, has four longitudinally spaced openings 32a in the upper surface thereof, through which the powdered or finely divided material may enter the tube. This arrangement is used where no agitation of the supply of material by the compressed air is needed, as in the powdered sugar dispenser which is provided with a mechanical agitator.

Tube 20, Figures 5 and 7, has a constricted portion 20c; there is at least one aperture 20d on the inlet side of the constricted portion and a pair of opposed apertures 20e on the outlet side thereof. This structure is satisfactory where it is desired to provide agitation by the compressed air, and to deliver only a relatively small amount of the ingredient. Where this tube is used, a portion of the charge of compressed air escapes through aperture 20d causing agitation of the material in the container.

In Figure 6, the tube 37 has an elongated V slot 37a in the upper surface thereof by means of which a relatively large quantity of the powdered material may enter the tube. An aperture 37b between the V slot and the inlet of the tube provides for agitation of the material. This tube may be used where a large quantity of material is to be dispensed.

Referring again to Figure 1, a source of compressed air indicated generally as 28 is provided for effecting discharge or dispensation of the finely divided or powdered ingredients from their respective containers. An electric motor 28a drives a compressor 28b to maintain a supply of compressed air in the reservoir 28c. The pressure of the air in the reservoir is indicated on the pressure dial 28d and may be controlled by the manual adjustment 28e. It has been found that a pressure of four to five pounds per square inch is sufficient for proper operation.

A system of conduits indicated generally as 29 connect the outlet 28f of the compressed air reservoir 28c to the inlets of the tubes associated with each of the ingredient containers 10, 11, 12 and 13. A plurality of electrically operated valves are associated with the conduits, one for each of the ingredient containers. For example electrically operated valve 30a controls the compressed air conduit 29a which is connected to the coffee container 10.

When it is desired to dispense a quantity of powdered coffee, the valve 30a is opened momentarily permitting a charge of compressed air from the source 28c to pass through the conduit 29a and through the tube 20 associated with the coffee container 10, causing discharge of a quantity of the powdered coffee through outlet conduit 31a attached to the outlet 20c of the tube. The outlet conduit 31a directs the powdered coffee into the funnel 17 where it mixes with hot water from the water heater 15 and the mixture flows into cup 14.

Similarly, quantities of the other desired ingredients may be discharged or dispensed from their respective containers and directed into the funnel 17 where they are mixed with a quantity of liquid ingredient from the water heater 15. The valves and conduits associated with the other containers have been given the same numeral designation as the valve and conduits associated with the coffee container 10, with different subscripts. Thus the apparatus associated with the cocoa container 11 bears the subscripts b, the cream container subscript c, with the sugar container the subscript d and with the water supply the subscript e.

A control and operating circuit for the dispenser, shown in Figure 8, is energized by connecting the leads 40 and 41 to a suitable source of power, as for example 110 volts A. C. The water heater 15 may be electrically heated by heating element 42 which is connected in series with a suitable thermostatic switch 43, a relief switch 44, a manual switch 45 and a fuse 46 across the line. The compressor motor 28a is similarly connected in series with a pressure control switch 47 and a fuse 48 across the line.

Assuming that the apparatus shown in Figure 1 is a part of a coined controlled dispensing machine, a cycle of operation may proceed in the following manner. A suitable coin or token inserted in a slot provided in the apparatus will engage coin switch 50, which is normally in the solid line position shown in the drawing, moving it momentarily to the dotted line position. When in the dotted line position, switch 50 closes contact 50a completing the energizing circuit for cup motor relay 51. When cup motor relay 51 is energized the contacts 51a and 51c associated therewith are closed, while contact 51b is opened. Contact 51b is in the circuit of the coin reject magnet 52, which is de-energized during the dispensing cycle to prevent further coins which may be inserted in the apparatus from impinging upon coin switch 50, disrupting the dispensing operation. Contact 51a forms a part of a holding circuit which maintains relay 51 energized after coin switch 50 has returned to its solid line position. Contact 51c is in the circuit of the cup motor 53. After relay 51 has been energized, coin switch 50 returns to its solid line position, closing contact 50b and completing a circuit energizing cup motor 53 through contact 51c of the cup motor relay.

As cup motor 53 begins to turn it causes a cup to be released from a suitable cup dispensing apparatus (not shown), and to be positioned beneath the funnel 17 to receive a beverage. As the motor continues to run suitable mechanical means associated with it, as for example a series of cams mechanically coupled to the shaft of the motor, cause the switches 60a, 60b, 60c, 60d and 60e, in the circuits of the electrically operated valves 30a, 30b, 30c, 30d and 30e respectively, to be closed. The customer will previously have selected the desired drink by proper adjustment of the dial 54 which may be on the front of the dispensing apparatus. Switches 54a, 54b, 54c and 54d are mechanically coupled to this dial and are electrically in the circuits of the valves 30a, 30b, 30c and 30d respectively.

Selection of the desired drink by manipulation of the dial 54 will cause the proper switches associated therewith to be closed. For example, if the customer desires coffee with cream and sugar, adjusting the dial to indicate this drink will cause switches 54a, 54c and 54d to close. Carrying this example through, when the cup motor 53 causes the switches 60a, 60b, 60c, 60d and 60e associated therewith to close, the water valve 30e will open allowing a suitable quantity of hot water to flow from the water heating tank 15 to the cup 14. Similarly, the valves 30a, 30c and 30d associated with the powdered coffee container 10, powdered cream container 12 and powdered sugar container 13 respectively, will be opened permitting a charge of compressed air to pass from the source 28c through the various passageways causing the discharge of the desired quantity of powdered ingredients from each of the containers into the funnel 17 where they are thoroughly mixed with each other and with the water from the tank 15; the resulting beverage flowing into the cup 14. If the customer desires black coffee, only switch 54a will be closed.

Similarly, if a cocoa or hot chocolate drink is desired the switches 54b, 54c and 54d will be closed delivering portions of cocoa, cream and sugar to the mixing funnel 17; the cream and sugar fortifying or enriching the chocolate drink.

If the quantity of any one of the powdered ingredients delivered by one charge of compressed air is insufficient, the appropriate switch associated with the cup motor 53 may be so arranged that it closes, opens and closes again to allow a second charge of compressed air to cause a second portion of the ingredient to be dispensed; this arrangement has been found to be more practical than increasing the duration of the charge of compressed air.

A counting mechanism 55 is connected in parallel with the coffee valve 30a and a similar counting mechanism is connected in parallel with the cocoa valve 30b to provide a record of the number of drinks of each type dispensed. The sugar agitating motor 25 is connected in parallel with the sugar valve 30d so that the powdered sugar is agitated each time the sugar valve is operated.

As the cup motor continues to run the switches 60a, 60b, 60c, 60d and 60e associated therewith are opened. The cup motor 53 is also mechanically coupled to the cup motor switch 57 which has two contacts 57a and 57b. After switches 60a, 60b, 60c, 60d and 60e are opened, normally closed contact 57a is opened and contact 57b is closed. The opening of contact 57a breaks the holding circuit for cup motor relay 51 which then de-energizes, opening contacts 51a and 51c and closing 51b. The cup motor is still energized through contact 57b and continues to turn for a few moments until contact 57b is opened and 57a again closed, returning the control circuit to its original condition ready to begin another dispensing cycle.

While the invention has been disclosed herein as incorporated in a beverage dispensing apparatus operating solely with powdered ingredients, it may also be used in dispensing powdered cream and sugar in other types of dispensing apparatus, as for example that disclosed in my co-pending applications Serial No. 336,563, filed February 12, 1953, now Patent No. 2,761,200 and Serial No. 353,621, filed May 7, 1953, relating to apparatus for brewing and dispensing coffee from the freshly ground coffee bean.

While I have shown and described certain embodiments of my invention, it is to be understood that it is capable of many modifications. Changes therefore, in the construction and arrangement may be made without departing from the spirit and scope of the invention as disclosed in the appended claims.

I claim:

1. Apparatus of the character described for discharging particulate material, comprising: means adapted to contain a supply of particulate material; means defining a passageway operably associated with said container means and having an aperture therein through which material enters said passageway; and means for causing a flow of gas to pass through said passageway and carry a quantity of said material with it, said material entering said passageway when gas is not flowing therethrough and being prevented from entering said passageway when gas is flowing therethrough.

2. Apparatus of the character described for discharging particulate material, comprising: means adapted to contain a supply of particulate material; means defining a passageway operably associated with said container means and having an opening therein through which material enters said passageway by gravity flow; and means for causing a flow of compressed gas to pass through said passageway and carry a quantity of said material with it, said means being arranged for agitating the material within said container means to prevent caking thereof and acting to prevent entry of material into the passageway through said opening when gas is flowing through the passageway.

3. Apparatus of the character described for discharging finely divided material, comprising: means adapted to contain a supply of finely divided material; means defining an apertured passageway communicably associated with said container means whereby a quantity of said material flows into said passageway by gravity; and means for causing a charge of compressed gas to pass through said passageway and carry a quantity of said material with it, said means being arranged for agitating the material within said container means and acting to prevent entry of material into the passageway through said opening when gas is flowing through the passageway.

4. Apparatus of the character described for discharging finely divided material, comprising: means adapted to contain a supply of finely divided material; means defining an apertured passageway operably associated with said container means and adapted to have a quantity of said material flow thereinto from said container means; and means for causing a charge of compressed gas to pass through said passageway and carry said quantity of said material with it, said means acting to prevent flow of material into the passageway during the passing of said charge through said passageway.

5. Apparatus of the character described for discharging particulate material, comprising: means adapted to contain a supply of particulate material; means defining a passageway through the lower portion of said container means and adapted to receive material therefrom by gravity; and means for causing a flow of gas to pass through said passageway and carry a quantity of said material with it, said means acting to prevent delivery of material from the container to the passageway when the gas is flowing therethrough.

6. Apparatus of the character described for discharging particulate material, comprising: means adapted to contain a supply of particulate material; means defining an apertured passageway extending generally transversely through said container means adjacent the bottom thereof and having an aperture in the top thereof through which a predetermined quantity of said material flows into said passageway by gravity; and means for causing a charge of compressed gas to pass through said passageway and carry said predetermined quantity of material with it, said means acting to prevent flow of material into the passageway during the passing of said charge through said passageway.

7. Means of the character described for discharging finely divided material, comprising: container means adapted to contain a supply of finely divided material; a source of compressed gas; means defining a passageway operably interconnecting said source of compressed gas and said container means; and means providing an outlet from said container means whereby a charge of compressed gas passing from said source through said passageway causes discharge of only a desired, predetermined quantity of said finely divided material previously delivered to said passageway from said container means through said outlet, said passageway means acting to prevent flow of material into the passageway during the passing of said charge through said passageway.

8. Means of the character described for discharging a quantity of finely divided material, comprising: a container adapted to hold a supply of finely divided material; a source of compressed air; means including a tube having a plurality of apertures therein and extending through said container, and having an inlet and an outlet, said apertures being adapted to have a quantity of said material enter said tube therethrough by gravity; means defining a first passageway connecting said source of compressed air to said inlet; a valve in said first passageway; means defining a second passageway connected to said outlet; means for opening said valve momentarily whereby a charge of compressed air passes through said first passageway, said tube and said second passageway, carrying along said quantity of said finely divided material from said passageway through said second passageway, said tube being arranged to prevent passage of material thereinto when said charge of air is passing therethrough.

9. Apparatus of the character described in claim 8, including means for agitating said material.

10. Apparatus of the character described in claim 8 wherein at least one of said apertures permits a portion of said charge of compressed air to agitate said material.

11. In a dispenser, means of the character described for delivering a beverage, comprising: means for delivering a liquid ingredient of said beverage; means adapted to contain a supply of a particulate ingredient; means defining a passageway operably associated with said container and having an inlet and an outlet; means operably connected to said inlet for causing a flow of gas to pass through said passageway and carry a predetermined quantity of said finely divided ingredient with it through said outlet; means associated with said outlet for directing said quantity of ingredient into said beverage and means for correlating the functioning of the liquid ingredient delivering means and the gas flow causing means to effect a substantially concurrent delivery of the beverage ingredients.

12. In a dispenser, means of the character described for delivering a beverage to a cup, comprising: means for delivering a liquid ingredient to said cup; means adapted to contain a supply of a finely divided ingredient; means defining an apertured passageway through said container, adapted to have a quantity of said material flow therein from said container, said passageway having an inlet and an outlet; means operably connected to said inlet for causing a charge of gas to pass through said passageway and carry said quantity of finely divided ingredient with it through said outlet while acting to prevent material from passing into the passageway from the container during passage of the charge therethrough; means associated with said outlet for directing said quantity of ingredient into said cup and means for correlating the functioning of the liquid ingredient delivering means and the means for causing a charge of gas to pass to effect a substantially concurrent delivery of the beverage ingredients.

13. In a dispenser, means of the character described for delivering a beverage to a cup, comprising: means for delivering a liquid ingredient to said cup; a plurality of means, each adapted to contain a supply of a different particulate ingredient; means operably associated with each of said container means, defining a passageway having an inlet and an outlet, each passageway being adapted to receive a predetermined quantity of material from the container means with which it is associated; means for causing a flow of gas through selected passageways, each such flow carrying said quantity of the selected particulate ingredient with it while acting to prevent delivery of material to the passageway during such flow; and means for correlating the functioning of the liquid ingredient delivering means and the gas flow causing means to effect a delivery of the beverage ingredients.

14. In a beverage dispenser, means of the character described for delivering a beverage to a cup, comprising: means for delivering a liquid ingredient to said cup; a plurality of containers, each adapted to hold a supply of a finely divided dry ingredient; means operably associated with each of said containers defining an apertured passageway therethrough, each passageway having an inlet and an outlet and being adapted to have a small predetermined quantity of said finely divided ingredient flow therein by gravity from the container with which it is associated; a source of compressed air; conduit means connecting said source of compressed air with the inlet of each of said passageways; a plurality of valves associated with said conduit means, one valve for each of said containers; means, including conduit means attached to the outlet of each of said passageways, operably connecting said containers with said cup; and means for selectively opening the valves associated with the containers of the desired ingredient whereby a charge of compressed air passes through the conduits and the passageways associated therewith and carries said small predetermined quantity of the desired ingredients into said cup.

15. A method of the character described for discharging a predetermined quantity of particulate material from a container having a passageway operably associated therewith, comprising: causing a predetermined quantity of said particulate material to enter said passageway; and then passing a charge of gas through said passageway, said charge of gas carrying said quantity of material with it while preventing further material from entering said passageway.

16. A method of the character described for discharging a quantity of a finely divided material from a container having an apertured passageway extending therethrough, comprising: causing a predetermined quantity of said finely divided material to enter said passageway through the apertures therein by gravity; and then passing a charge of compressed air through said passageway, said charge of compressed air carrying only said quantity of material with it.

17. A container assembly of the character described, adapted to have a particulate material discharged therefrom, comprising: container means adapted to hold a supply of particulate material; and means defining a passageway operably associated with said container means whereby material enters said passageway from said container by gravity, said passageway being adapted to be connected to means for causing a charge of gas to pass therethrough for discharging a quantity of material therefrom and arranged to cause said gas charge to limit automatically the quantity of material discharged.

18. A container assembly of the character described, adapted to have a finely divided material discharged therefrom, comprising: container means adapted to hold a supply of finely divided material; and means defining a passageway operably associated with said container means whereby a predetermined quantity of material enters said passageway from said container by gravity, said passageway being adapted to be connected to means for causing a charge of gas to pass therethrough discharging said quantity of material therefrom, acting to prevent flow of material into the passageway during the passing of said charge through said passageway and agitating said material within said container.

19. A container assembly of the character described, adapted to have a finely divided material discharged therefrom, comprising: container means adapted to hold a supply of finely divided material; and means defining a passageway extending generally transversely through said container means adjacent the bottom thereof whereby a predetermined quantity of said material enters said passageway from said container by gravity, said passageway having an inlet and an outlet, said inlet being adapted to be connected to means for causing a charge of gas to pass therethrough, to discharge said quantity of material therefrom through said outlet, said means acting to prevent flow of material into the passageway during the passing of said charge through said passageway.

20. A container assembly of the character described, adapted to have a finely divided material discharged therefrom, comprising: container means adapted to hold a supply of finely divided material; and means defining an apertured passageway through said container means and operably associated therewith whereby a quantity of said material flows into said passageway through said apertures by gravity from said container, said passageway being adapted to be connected to means for causing a charge of gas to pass therethrough, removing said quantity of material therefrom, said means acting to prevent flow of material into the passageway during the passing of said charge through said passageway.

21. A container assembly of the character described, adapted to have a finely divided material dispensed therefrom, comprising: container means adapted to hold a supply of finely divided material; and means defining a continuous apertured passageway through said container and adjacent the bottom thereof, said passageway having an inlet and an outlet, said inlet being adapted to be connected to means for causing a charge of gas to pass therethrough, removing a quantity of material therefrom and expelling it through said outlet, said means acting to prevent flow of material into the passageway during the passing of said charge through said passageway.

22. A container of the character described in claim 19 wherein said passageway means are provided with a plurality of longitudinally spaced apertures in the top thereof.

23. A container of the character described in claim 19 wherein said passageway means are provided with a plurality of apertures, one aperture being an elongated V-shaped slot in the top thereof.

24. A container of the character described in claim 19 wherein said passageway means has a restricted portion, there being at least one aperture on the inlet side of said restricted portion and at least a pair of opposed apertures on the outlet side thereof.

References Cited in the file of this patent

UNITED STATES PATENTS

| | | |
|---|---|---|
| 2,202,079 | Ayres | May 28, 1940 |
| 2,219,208 | Knight | Oct. 22, 1940 |
| 2,462,019 | Bowman | Feb. 15, 1949 |
| 2,540,059 | Stirn et al. | Jan. 30, 1951 |
| 2,569,486 | Mills | Oct. 2, 1951 |
| 2,614,738 | Mills | Oct. 21, 1952 |
| 2,648,466 | Baur et al. | Aug. 11, 1953 |